United States Patent [19]
Coggin, Jr.

[11] 3,988,135
[45] Oct. 26, 1976

[54] ASSEMBLY FOR THE DRAWING OF GLASS FIBERS
[75] Inventor: Charles H. Coggin, Jr., Glendora, Calif.
[73] Assignee: Kaiser Glass Fiber Corporation, Azusa, Calif.
[22] Filed: July 28, 1975
[21] Appl. No.: 599,720

[52] U.S. Cl. .......................................... 65/1; 65/2; 65/11 W; 65/173; 65/374 RM
[51] Int. Cl.² ........................................ C03B 37/02
[58] Field of Search ............. 65/1, 2, 11 W, 12, 27, 65/374 RM, 135, 345, 172, 173

[56] References Cited
UNITED STATES PATENTS

| | | | |
|---|---|---|---|
| 1,954,732 | 4/1934 | Gossler | 65/12 X |
| 2,947,028 | 8/1960 | Slayter | 65/12 |
| 3,283,055 | 11/1966 | Trethewey | 65/12 X |
| 3,539,318 | 11/1970 | Glaser et al. | 65/11 W |
| 3,726,655 | 4/1973 | Mitcham et al. | 65/11 W X |
| 3,837,823 | 9/1974 | Shealy | 65/1 |
| 3,867,119 | 2/1975 | Kasuga | 65/1 X |
| 3,905,790 | 9/1975 | Strickland | 65/1 X |

Primary Examiner—Robert L. Lindsay, Jr.
Attorney, Agent, or Firm—Naylor, Neal & Uilkema

[57] ABSTRACT
A flow block and bushing assembly employing an orifice plate having a perforated drawing area with a planar undersurface against which bulk gas flow is directed for cooling and fiber attenuation purposes. The flow block is comprised of an interior layer of highly glass corrosion resistant material, such as zircon, and an exterior layer of highly thermal shock-resistant material. A flow passage extends through both of said layers and is lined with platinum foil. The bushing assembly is removably secured beneath the flow block and comprises a body of refractory material having a flow chamber extending therethrough in alignment with the flow passage. The flow chamber is lined with a platinum foil lining and the orifice plate is joined to the lining and extends over the lower end of the chamber. The orifice plate is reinforced by ribs integrally joined to and extending across the upper surface of its perforated drawing area and a perforated reinforcing plate is integrally joined to the ribs in spaced parallel relationship to the orifice plate. Electrodes are joined to the orifice plate to either side of the drawing area whereby electrical current may be passed through the orifice and reinforcing plates and flow chamber walls to effect the resistance heating thereof. Bulk gas flow is provided by a nozzle having a plurality of individual inlet conduits communicating with a common elongate discharge passage. An adjustable manifold communicates with the inlet conduits of the nozzle to provide for the selective supply of gas thereto and the nozzle is adjustably mounted so that its angular orientation relative to the undersurface of the drawing area may be varied.

9 Claims, 11 Drawing Figures

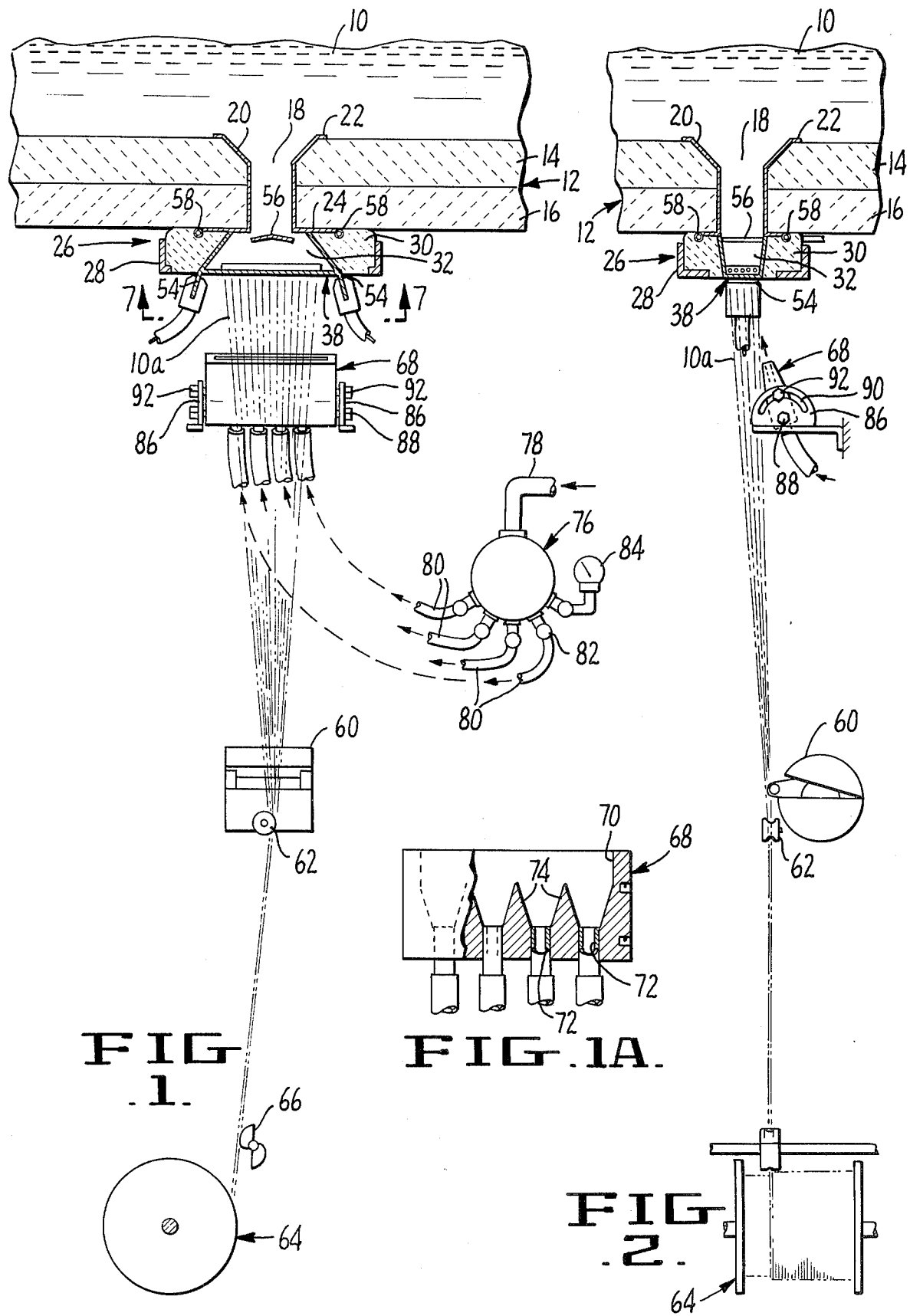

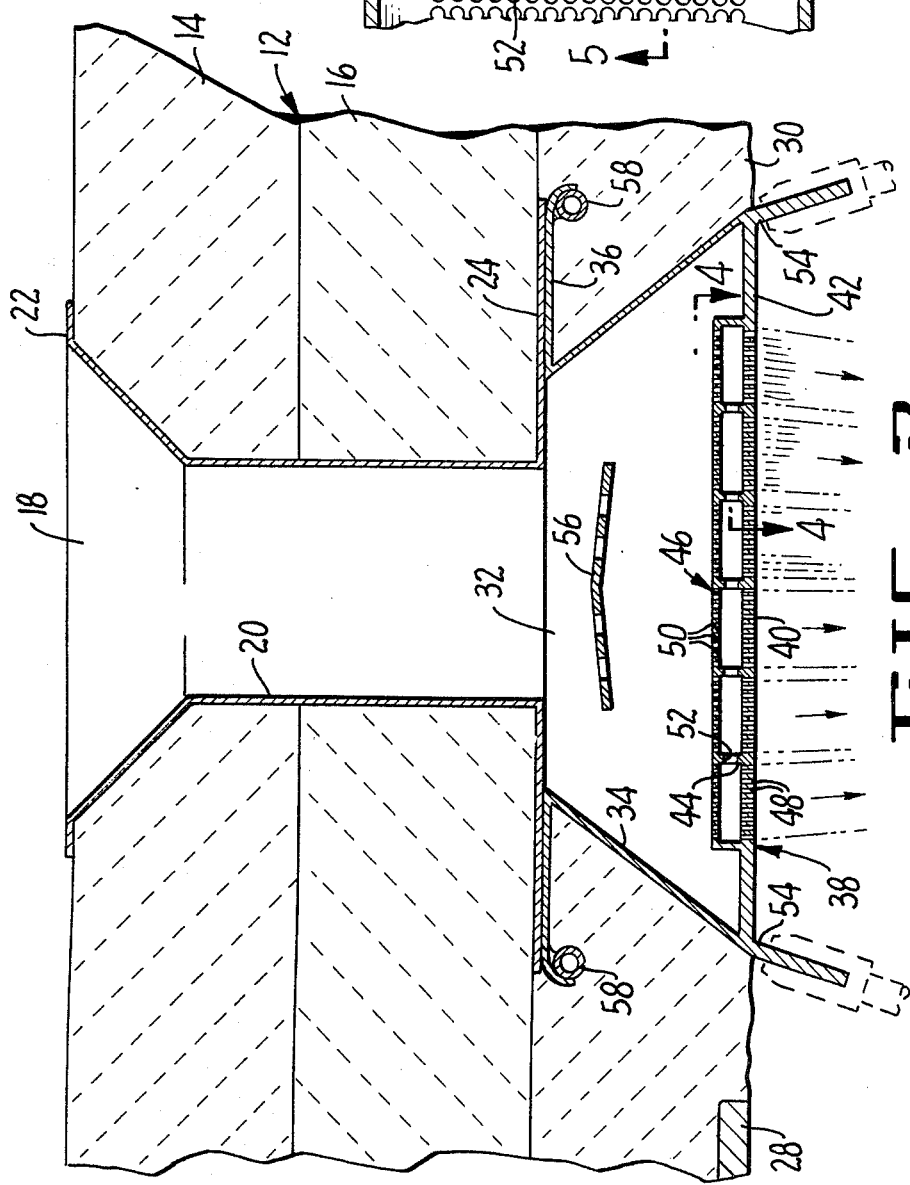
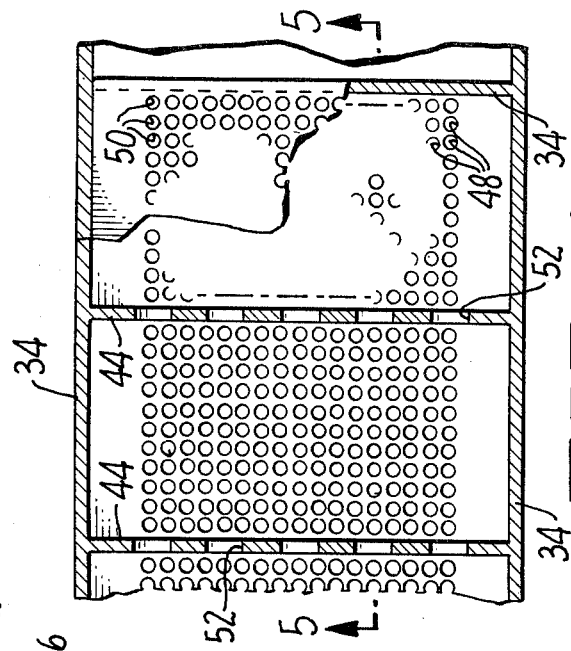
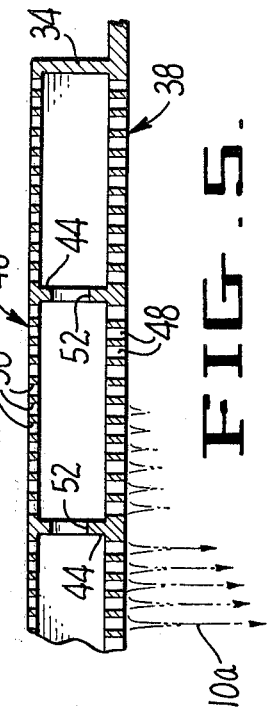

ASSEMBLY FOR THE DRAWING OF GLASS FIBERS

BACKGROUND OF THE INVENTION

The present invention relates to improved apparatus for the drawing of glass fibers and is particularly concerned with such an apparatus wherein the orifice plate of the drawing bushiing is provided with a generally planar undersurface and bulk flow gas is directed upwardly against the undersurface to achieve fiber cooling and attenuation.

The invention is specifically concerned with an improvement in the apparatus disclosed in U.S. application Ser. No. 500,303, filed Aug. 26, 1974, by Edward T. Strickland. That application discloses a method and apparatus for forming glass fibers wherein the orifice plate has a generally planar undersurface and bulk flow gas is directed upwardly against the undersurface to effect cooling and fiber attenuation.

The method and apparatus of the aforementioned application is particularly desirable in that the orifice plate employed therein does not require that nozzles extend downwardly from the orifice plate. Such nozzles are typical of the prior art and are employed to effect cooling of the fibers being drawn and to maintain the fibers in separated condition. Such nozzles have the disadvantage that they add to the complexity of the orifice plate and greatly limit the density of the orifices which can be provided in the plate. The relatively large size of the orifice plate required when nozzles are employed makes it difficult to uniformly cool the plate and, thus, difficult to draw fibers of uniform diameter. Also, such bushing assemblies require relatively great amounts of precious metal alloys, thus greatly increasing their expense.

An example of a piror art assembly wherein the orifice plate is provided by nozzles may be found in U.S. Pat. No. 3,492,104 to Glaser, granted Jan. 27, 1970. The assembly shown in that patent bears certain similarities to that of the assembly of the present invention, but is critically different therefrom in a number of respects. In particular, the orifice plate of the assembly includes nozzles or tips fixed to and extending downwardly from the orifice plate and an external support is provided centrally of the plate in a V-shaped groove formed therein.

SUMMARY OF THE INVENTION

The present invention may be summarized as an improved assembly for the drawing of glass fibers in a system wherein the orifice plate is of a flat undersurface type and bulk flow gas is directed against the undersurface of the plate to effect cooling and fiber attenuation. The assembly provides a bushing which may be readily broken away from the flow block with which it is used and wherein the orifice plate in the bushing is internally reinforced through a reinforcing plate which functions to filter the glass being drawn, reinforces the orifice plate against distortion, and acts as part of a conditioning chamber to maintain the glass being drawn at a high uniform temperature. The latter result is achieved by incorporating the orifice plate and the reinforcing plate into part of a resistance heating circuit for the bushing. The assembly also provides a flow block of high wear and thermal shock resistance and a bulk flow nozzle capable of adjustment to achieve uniform flow against the undersurface of the orifice plate.

A principal object of the present invention is to provide an orifice plate of the planar undersurface type wherein reinforcement of the plate is provided by internal structure which braces the plate against heat and pressure distortion, screens molten glass before it passes through the orifices of the orifice plate, and serves as part of a resistance heater to heat molten glass immediately adjacent the orifice plate.

Another and related object of the invention is to provide a structure which enables the use of a thin orifice plate and a high density orifice pattern in the plate.

BRIEF DESCRIPTION OF THE DRAWINGS

FIG. 1 is an elevational view, with parts thereof shown in section, diagrammatically illustrating the assembly of the present invention in the process of drawing glass fibers;

FIG. 1A is an elevational view of the nozzle of the present invention, with parts thereof broken away and shown in section to illustrate the internal structure of the nozzle;

FIG. 2 is an elevational view of the assembly, taken on a plane 90° offset from that of FIG. 1, and similarly diagrammatically illustrating the use of the assembly;

FIG. 3 is an enlarged elevational cross-sectional view of the flow block and bushing assembly, taken on substantially the same plane as FIG. 1;

FIG. 4 is a cross-sectional view taken on the plane designated by Line 4—4 in FIG. 3;

FIG. 5 is a cross-sectional view taken on the plane designated by Line 5—5 in FIG. 4;

DESCRIPTION OF THE ILLUSTRATED EMBODIMENTS

Figure 6:
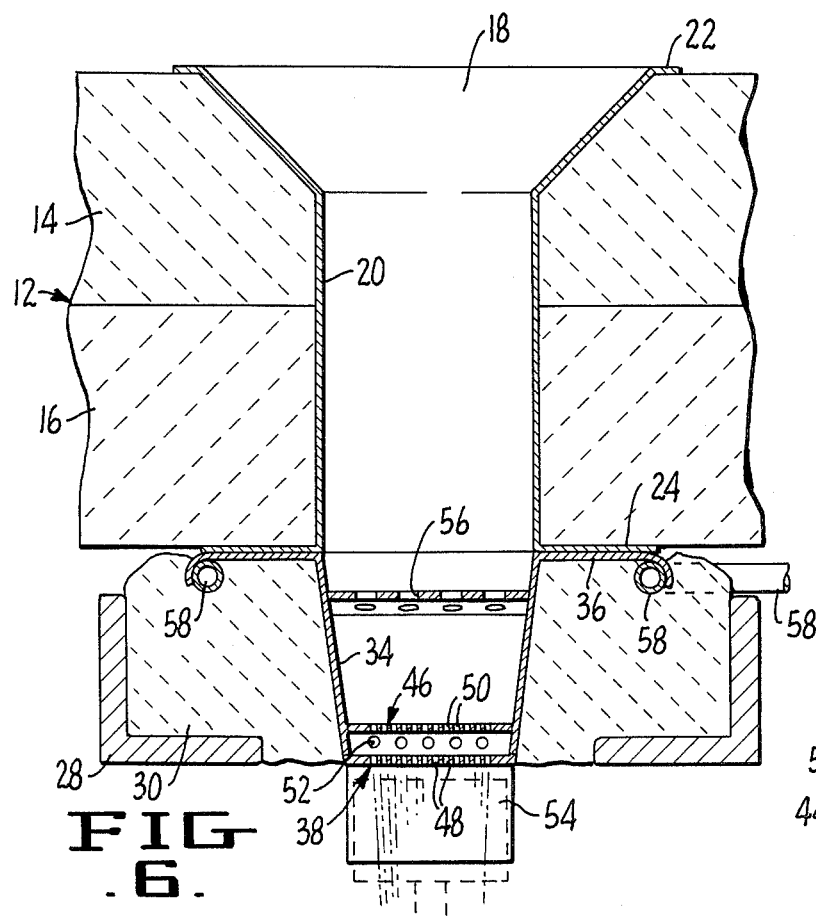
FIG. 6 is an enlarged cross-sectional view of the flow block and bushing assembly, taken on substantially the same plane as FIG. 2.

Referring now to FIG. 1, the assembly of the present invention is shown therein as incorporated into the underside of a direct melt forehearth. The molten glass within the forehearth is designated by the numeral 10. The underside of the forehearth comprises a flow block, designated 12, constructed according to the present invention. The flow block 12 is comprised of an interior layer 14 fabricated of a highly heat and glass resistant material, such as zircon, and an exterior layer fabricated of a material having high thermal shock resistant properties, such as that commerically known as MULLITE. A flow passage 18 extends through the flow block and is lined with a platinum foil lining 20. The foil lining completely covers the flow passage 18 and extends over the exterior peripheral surface surrounding the passage, as seen at 22 and 24 (See FIG. 3).

The platinum lining 20 shields the passage 18 from erosion and spalling as a result of the flow of hot glass therethrough and is practical, from an economical standpoint, because of the relatively small size of the passage. This small size is permissible because of the high orifice density provided by the bushing of the present invention. The provision of the lining 20 permits the use of a high thermal shock resistant material, such as MULLITE, for the exterior layer of the flow block, as this layer is fully shielded from direct contact with molten glass.

The small size of the passage 18 provides for a more rapid flow of molten glass than occurs in the larger opening in conventional flow blocks. The more rapid flow eliminates the possibility of stagnant or slow moving glass from which crystal growth can occur. The glass is also more thermally homogeneous than the glass flowing through the comparatively large opening in conventional flow blocks. As an example of the relative size of the passage 18, as compared to conventional flow block passages, the passage 18 might be 2 inches in diameter (i.e., about 3 square inches), whereas a conventional passage might typically measure 2 inches by 14 inches (i.e., about 28 square inches).

A variation of the described flow block for installation of the bushing assembly onto a conventional direct melt forehearth designed for conventional bushings is illustrated in FIG. 10. As there seen, the lower block of the conventional direct melt forehearth has been removed and replaced with a special glass contact block 16a with a relatively small flow passage 18a lined with a platinum lining 20a. The upper flow block 14a has a large conventional sized flow passage feeding glass through to the smaller platinum lined opening in the special block 16a. The bushing assembly (26) fastens to the lower block as hereinafter described. The special block covers the relatively large opening in the block 14a and is fabricated of a highly thermal shock resistant material, such as MULLITE.

Although the term "platinum" is used to describe the lining 20 and will be used to describe other components forming part of the assembly, it should be understood that the term is intended to embrace alloys of platinum, as well as pure platinum. For instance, it is anticipated that the platinum may take the form of a platinum rhodium alloy, possibly zirconia grain stabilized.

The bushing assembly, designated 26, is removably supported beneath the flow block 12 in juxtaposition to the undersurface of the exterior layer 16. Support is effected through means of a framework comprised of angle members 28 which engage the lateral sides and undersurface of the assembly to maintain the assembly in aligned position with respect to the flow passage 18.

The bushing assembly comprises a block 30 having a chamber 32 formed therein and opening through the upper and lower surfaces of the block. The chamber 32 is aligned with the flow passage 18 when the bushing assembly is in place. When viewed as seen in FIGS. 1 and 3, the side walls of the chamber diverge laterally from the upper to the lower surfaces of the block 30. As viewed in FIGS. 1 and 6 (i.e., 90° from the plane of viewing used for FIGS. 1 and 3), the chamber converges from the upper to the lower surfaces of the block 30.

The interior of the chamber 32 is lined with a platinum foil lining 34 and a flange 36 is joined to the upper end of the lining and extends around the open upper end of the chamber 32 and partically over the upper surface of the block 30. When the bushing assembly is in place beneath the flow block, the collar 36 assumes juxtaposed sealed engagement with the exterior peripheral surface 24 of the lining 20 (See FIG. 3). The open lower end of the chamber 32 is covered by the orifice plate of the present invention, designated 38, which plate is fabricated of platinum and peripherally joined to the lower edge of the lining 34 so as to have fluid-tight electrically conductive connection therewith.

The orifice plate 38 is fabricated of platinum and has a plan configuration conforming in shape to the open lower end of the chamber 32. The plate is formed with a perforated drawing area 40 extending over substantially the entire width thereof, as viewed in FIGS. 2 and 6, and over the majority of the length thereof, as viewed in FIGS. 1 and 3. As may be seen best from FIG. 3, the plate 38 is formed with unperforated sump or collection areas 42 to either side of the drawing area. The undersurface of the orifice plate is planar (i.e., flat) over the entire drawing area 40 and no nozzles or tips protrude therefrom.

The orifice plate 38 is reinforced through means of an "egg crate" type of structure integrally joined to its inner surface. This structure comprises apertured rubs 44 extending transversely across the plate (as viewed in FIGS. 2 and 6) and a perforated reinforcing plate, or screen, 46 of an area coextensive with the drawing area, extending over the ribs in spaced parallel relationship to the upper surface of the orifice plate. The ribs 44 are fabricated of the same material as the orifice plate 38 and reinforcing plate 46 (i.e., platinum) and are integrally joined to said plates by welding or diffusion bonding. The integral joinder may be seen from FIG. 5 wherein the orifice plate, ribs and reinforcing plate are depicted as being an integral structure without joints. FIG. 4 shows that the ribs 44 are also similarly integrally joined to the side walls of the lining 34. The integral joinder of the orifice plate, reinforcing structure and liner provides both a very rigid structure and a structure capable of conducting electrical current to facilitate resistance heating of the orifice and reinforcing plates, as will be developed in more detail subsequently.

FIG. 5 illustrates the construction of the orifice plate and the reinforcing structure which provides for the flow of molten glass through the plate and structure. This construction comprises drawing orifices 48 formed through the orifice plate, perforations for orifices 50 in the reinforcing plate 46, and relatively large apertures 52 formed in the ribs. The phantom-line representations, shown in FIG. 5, are intended to diagrammatically illustrate the coning of glass as it is drawn through the orifices 48 and attenuated into fine glass filaments or fibers. The orifices 48 and 50 are designed to insure that molten glass may pass through the reinforcing plate at a rate at least as great as the rate it passes through the drawing orifices 48. This may be achieved by designing the orifices according to the following formula:

$$Q = \frac{N K D^4 H}{V L}$$

where:
- $Q$ = Rate of flow
- $N$ = Number of orifices
- $K$ = Constant
- $D$ = Orifice diameter
- $H$ = Head of glass
- $V$ = Viscosity
- $L$ = Orifice length (i.e., plate thickness)

In applying this formula, $K$, $H$ and $V$ may be treated as being constant for the respective plates. Thus, the variables are $N$, $D$ and $L$.

The apertures 52 permit the relatively unrestricted flow of molten glass through the ribs 44. This permits glass to flow freely through the ribs and assures that the segments of the orifice plate between the ribs will be supplied with molten glass, even if a particular segment of the reinforcing plate should become blocked. In the preferred arrangement, the apertures 52 have a depth less than the depth of the ribs 44 and, thus, the ribs have continuous edges which are integrally joined to the orifice and reinforcing plates. This permits the ribs to act as beams and maximizes their ability to reinforce the orifice plate against distortion. The preferred arrangement also employs a structure wherein the orifice and reinforcing plates are not perforated at the areas where they are joined by the ribs. This also aids in maximizing the reinforcing ability of the ribs.

The aforedescribed reinforcing structure also functions to screen seeds, cords, sloughed off lining and other adverse particles from entering the orifices of the orifice plate. This is particularly advantageous, since the presence of such particles in the orifices of the orifice plate is likely to cause "break-out" of the fibers being drawn therefrom and then flooding of the plate. The reinforcing plate also has the advantage that, together with the ribs and the orifice plate, it forms a conditioning chamber to condition molten glass immediately prior to its entry into the orifices of the orifice plate. This chamber greatly reduces any tendency for the glass to channel within the bushing. It also, through means of electrode connectors or bushing ears 54 secured to the orifice plate to either side of the drawing area, provides a heating chamber immediately adjacent the drawing area. This chamber provides means whereby the glass entering the orifices of the orifice plate may be elevated to a uniform and controlled temperature.

The aforementioned heaing chamber is provided by passing current through the orifice plate, ribs and reinforcing plate. Such current functions to resistance heat both the orifice plate and the reinforcing plate. The extent of heating by each plate may be controlled by varying the thickness of the respective plates.

The electrode connectors or bushing ears 54 are attached directly to and across the width of the orifice plate. The electrode connector is, in fact, an extension of the orifice plate. The purpose is to direct the major portion of electrical current through the orifice plate and reinforcing plate and only a minor portion through the end walls and side walls of the flow chamber. In conventional bushings, the electrode connectors are attached to the center of the end walls and the major portion of the current is directed through the upper areas of the bushing flow chamber. In fact, some bushings have heater strips in the upper screen area in order to better heat the glass in the upper area and not in the orifice plate area. The generally flat bushing described herein requires the major heating to be provided by the orifice plate in order to make up for the heat loss caused by the cooling effect of the bulk gas flow. Also, the plate temperature must respond quickly to temperature adjustments during the flood clearing procedure.

Figure 8:
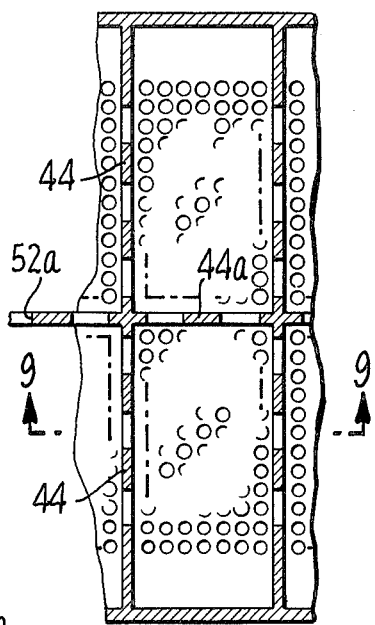
FIG. 8 is a cross-sectional view, similar to FIG. 4, illustrating an alternative embodiment of the rib structure used to reinforce the orifice plate.
Figure 9:
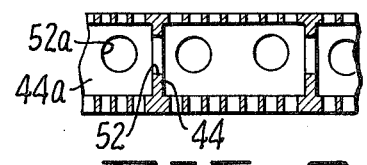
FIG. 9 is a cross-sectional elevational view, taken on the plane designated by Line 9—9 in FIG. 8; and, FIG. 10 is an elevational view, with parts thereof shown in section, diagrammatically illustrating the manner in which the bushing assembly of the present invention may be applied to a conventional forehearth having a relatively large flow passage.
Figure 7:
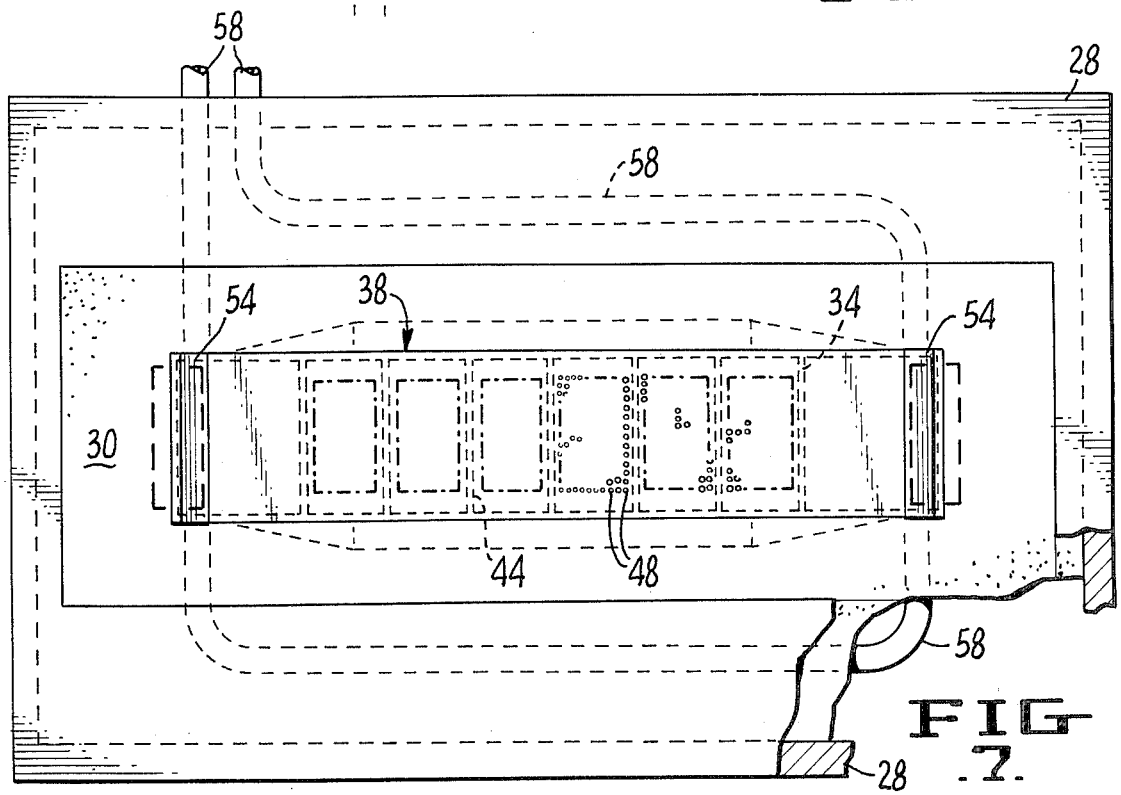
FIG. 7 is a plan view of the underside of the bushing assembly, with parts thereof broken away for purposes of illustration, taken on the plane designated by Line 7—7 in FIG. 1.

FIGS. 8 and 9 illustrate an alternative embodiment of the reinforcing structure for the orifice plate. This embodiment differs from that previously described in that a longitudinal rib 44a extends lengthwise of the drawing ares of the orifice plate. The rib 44a is of a construction similar to the ribs 44 in that its edges are continuous and it is apertured to permit the relatively unrestricted flow of glass therethrough. The apertures in the ribs 44a are designated by the numeral 52a. As with the ribs 44, the areas of the orifice and reinforcing plate to which the rib 44a is joined are preferably not apertured.

The bushing assembly also includes a deflector plate 56 secured across the entry of the chamber 32 in spaced relationship to the lower extremity of the passage 18. The plate 56 is held in place by attachment to the side walls of the lining 34 of the bushing flow chamber 32 and is of perforated generally peaked construction. Because of the peaked configuration of the plate, it tends to deflect molten glass entering the chamber 32 laterally toward the collection areas 42. Thus, the plate functions to reduce the degree to which molten glass entering the chamber impinges directly on the reinforcing plate 46 and to direct particles, such as refractory stones or crystals, to the collection areas. In the preferred embodiment illustrated, the ribs of the reinforcing structure immediately adjacent the sump areas 42 are not apertured. Thus, particles collected in the collection areas are isolated from the drawing area of the orifice plate.

The basic structure of the bushing assembly is completed through means of a heat exchange conduit 58 extending through the block 30 and around the upper portion of the chamber 32. This conduit is of relatively conventional construction and is employed to prevent glass leakage between the bushing flange and bottom lining of the flow block.

Referring again to FIGS. 1 and 2, the glass therein is shown as being attenuated into fibers by being drawn through the orifice plate 38. The glass fibers, or filaments, are designated by the numberal 10a and are shown as being drawn over a dressing binder applicator 60, from whence they are drawn over a gathering shoe 62 and then directed to a collector and winding mechanism 64. A traverse 66 guides the filaments back and forth across the mechanism 64. The construction and mode of operation of the applicator 60, shoe 62, mechanism 64, and traverse 66 are conventional.

During the drawing process, bulk gas flow is directed upwardly against the flat undersurface of the orifice plate 38 by a nozzle 68. As with the method and apparatus of aforementioned application Ser. No. 500,303, this gas functions to effect cooling and fiber attenuation. The nozzle of the present invention is unique, however, in the particular construction which it provides to control the bulk flow of gas. This construction may be seen from FIGS. 1, 1A and 2.

The nozzle 68 comprises a body having an elongate discharge passage 70 formed therein through which gas exits the nozzle and a plurality of individual inlet conduits 72 leading into the discharge passage over the length thereof. Guide elements 74 within the nozzle provide divergent mouths which lead from each of the inlet conduits 72 into the elongate discharge passage 70.

Gas is supplied to the nozzle 68 through means of a manifold 76 which receives gas through an inlet pipe 78 and directs this gas to the respective inlet conduits 72 through tubes 80. Each tube 80 is secured to the manifold 76 through means of a valve 82 having a selectively variable flow area. Thus, the valves 82 may be selectively operated to adjust the gas flow to the respective inlet conduits 72. A pressure gauge 84 communicates with the interior of the manifold to indicate the pressure maintained therein.

As a result of the aforedescribed nozzle and manifold, bulk gas flow to the undersurface of the orifice plate may be selectively varied over the width of the plate so as to maintain the desired separation of the cones of glass being drawn from the plate. Selective adjustment of the effect of the bulk gas flow impinging on the under side of the plate is also provided through means of a mounting which permits control of the angle of incidence at which gas is directed to the undersurface of the plate. This mounting takes the form of arcuate plates 86 disposed to either side of the nozzle and to which the nozzle body is journaled by bolt pins 88 extending through the plates and into threaded engagement with the sides of the nozzle. The nozzle is locked at select angular positions relative to the arcuate plates through means of arcuate slots 90 provided in the plates and lock bolts 92 extending through the slots and into threaded engagement with the body of the nozzle. To adjust the angular inclination of the nozzle, it is simply necessary to loosen the bolts 92 and pivot the nozzle body about the bolts 88 to the desired position. Once in the desired position, the bolts 92 are tightened against the plates 86 and, thus, the angular position of the nozzle is fixed.

The structure of the flow block and bushing assembly of the present invention is particularly advantageous in that it facilitates ease of removal of the bushing assembly for servicing. To effect such removal, it is simply necessary to solidify the glass within the flow passage 18 by playing a cooling medium against the underside of the bushing assembly and then to break the bushing assembly away. The breakaway presents no particular problem, as the area of the glass being broken is relatively small and no structure of the bushing assembly extends into the flow passage. The use of the cooling medium, such as water, to freeze the glass does not deleteriously affect the structure of the bushing assembly and flow block, as all portions exposed to the medium are constructed of material which is highly resistant to thermal shock. In this respect, it is noted that the interior layer 14 of the flow block is shielded from the cooling medium by the exterior layer 16.

EXAMPLES

The parameters of the various elements employed in the present invention may vary considerably. This is particularly true of the specific construction of the bushing assembly. Examples of the bushing assembly, specifying both physical and performance characteristics, follow:

| | |
|---|---|
| Bushing Design "A" | 795 orifices |
| ALLOY TYPE | 90 platinum - 10 rhodium |
| ORIFICE PLATE | |
| Orifice diameters | 0.047" |
| Center spacing | 0.070" |
| Plate thickness | 0.060" |
| Orifice pattern | Five sections, 11 rows, alternating 14 and 15 orifices, total of 159 orifices per section. |
| Drawing area dimensions | 1.027" by 3.5" |
| Plate dimensions | 1.5" by 6" |
| REINFORCING PLATE | 1130 orifices and 0.047" diameter and 0.015" thick. |
| RIBS | 0.040" by 0.310" by 1.5" on 0.7" centers. |
| PERFORMANCE | |
| Set-point temperature | 2210° F. – 2300° F. |
| Throughput | 32.0 – 51.5 lbs./hour |
| Bushing Design "B" | 798 orifices |
| ALLOY TYPE | 80 platinum-20 rhodium - rest 90 platinum-10 rhodium |
| ORIFICE PLATE | |
| Orifice diameter | 0.047" |
| Center spacing | 0.075" |
| Plate thickness | 0.060" |
| Orifice pattern | Six sections (15 × 9) –12 corners square pattern |
| Drawing area dimensions | 1.12" by 4.25" |
| Plate dimensions | 1.5" by 6.5" |
| REINFORCING PLATE | 1200 orifices each 0.047" diameter 0.015" thick |
| RIBS | 0.040" by 0.250" by 1.5" on 0.71" centers |
| PERFORMANCE | |
| Set-point temperature | 2250° F. – 2310° F. |
| Throughput | 44.0 – 57.0 lbs./hour |
| Bushing Design "C" | 810 orificies |
| ALLOY TYPE | 80 platinum-20 rhodium plate - rest 90 platinum-10 rhodium |
| ORIFICE PLATE | |
| Orifice diameter | 0.047" |
| Center spacing | 0.080" |
| Plate thickness | 0.060" |
| Orifice pattern | Six sections (15 × 9) square pattern 1200 orifices each 0.047" diameter |
| Drawing area dimensions | 1.2" by 4.5" |
| Plate dimensions | 1.5" by 6.5" |
| REINFORCING PLATE | 1200 orifices each 0.047" diameter 0.15" thick |
| RIBS | 0.040" by 0.250" by 1.5" on 0.75" centers |
| PERFORMANCE | |
| Set-point temperature | 2230° F. – 2360° F. |
| Throughput | 27.0 – 49.0 lbs./hour |

In each of the above examples, the thickness of the flow chamber side walls (i.e., the walls of the lining 32, shown in cross-section in FIG. 2) is 0.020 inches and the thickness of the flow chamber end walls (i.e., the walls of the lining 32, shown in cross-section in FIG. 1) is 0.040 inches. The electrode connectors measure 0.125 in thickness and the flange 24 measures 0.015 inches in thickness.

CONCLUSION

It should be apparent that the present invention enables the attainment of the objects initially set forth herein. The invention is not intended to be limited to the specifics of the illustrated embodiments, however, but rather is defined by the accompanying claims.

What is claimed is:

1. In a glass fiber drawing assembly of the type comprising a non-tip orifice plate with a drawing area having a flat undersurface through which fibers are drawn, means for drawing glass fibers from the plate, a supply nozzle for directing bulk gas against the undersurface of the plate and current supply means to direct current through the plate to effect the resistance heating thereof, an improved orifice plate for use in the assembly, said plate comprising:

a non-tip plate element having a drawing area perforated by a multitude of drawing orifices extending therethrough in closely spaced relationship to one another, said plate element having upper and lower surfaces through which said orifices open, at least the lower of which surfaces is planar;

intersecting reinforcing ribs integrally joined to one another at the intersections thereof and integrally joined to the upper surface of the plate element and extending across the drawing area thereof; and, a reinforcing plate integrally joined to said ribs in spaced parallel relationship to the upper surface of the plate element, said reinforcing plate being substantially coextensive with the drawing area of the plate element and perforated by a multitude of closely spaced openings having a total resistance to flow less than the total resistance to flow of the orifices in the plate element.

2. In a combination according to claim 1, the improved orifice plate wherein the openings in the reinforcing plate have individual areas no greater than the individual areas of the orifices in the plate element.

3. In a combination according to claim 1, the improved orifice plate wherein the intersecting reinforcing ribs extend transversely across the full width of the drawing area of the plate element and have uninterrupted continuous edges joined over the full lengths thereof to the plate element and the reinforcing plate.

4. In a combination according to claim 1, the improved orifice plate wherein:

said plate element, reinforcing ribs and reinforcing plate are fabricated of electrically conductive material and are joined in electrically conductive relationship to one another; and electrode connections are provided on the plate element to either side of the drawing area whereby electrical current may be passed through the plate element, the ribs and reinforcing plate to resistance heat both the plate element and the reinforcing plate.

5. An assembly for the drawing of glass fibers, said assembly comprising:

a flow block having an interior formed by a layer of glass corrosion resistant refractory composition and an exterior formed by a layer of highly thermal shock resistant material juxtaposed to the underside of said interior, said block having a flow passage therein extending through both said interior and said exterior;

a platinum lining covering the flow passage;

a bushing frame disposed beneath the flow block to removably support a bushing beneath said block;

a bushing removably supported on said bushing frame in juxtaposition to the underside of the exterior of the block, said bushing being composed of refractory material and having a chamber therein and opening through the upper and lower surfaces thereof, said chamber being in aligned fluid communication with the flow passage in the flow block and lined with a platinum liner; and, a non-tip orifice plate secured over the end of the chamber opening through the lower surface of the bushing, said plate having upper and lower surfaces, at least the lower of which is planar, and a drawing area perforated by a multitude of closed spaced drawing orifices;

intersecting reinforcing ribs integrally joined to one another at the intersections thereof an integrally joined to the upper surface of the orifice plate; and, a reinforcing plate integrally joined to said ribs in spaced parallel relationship to the upper surface of the orifice plate, said plate being substantially coextensive with the drawing area of the plate and perforated by a multitude of closely spaced openings.

6. In a combination according to claim 1, the improved orifice plate wherein at least some of the ribs are perforated to permit substantially unrestricted fluid flow therethrough.

7. A bushing assembly for the drawing of glass fibers, said assembly comprising:

a refractory block having upper and lower surfaces and a chamber extending therethrough between said surfaces, said chamber when viewed in cross-section from at least one direction, diverging from the upper surface of the block to the lower surface of the block;

a non-tip orifice plate secured over and covering the end of said chamber which opens through the lower surface of the block, said plate having a planar lower surface and a perforated drawing area of a size less than the area of the chamber which opens through the lower surface of the block whereby an unperforated collection area is formed by said plate to at least one side of the drawing area thereof;

intersecting reinforcing ribs integrally joined to one another at the intersections thereof and integrally joined to the upper surface of the orifice plate, the outermost of said ribs defining a peripheral dam surrounding the perforated drawing area of the plate to separate said area from the collection area;

a reinforcing plate integrally joined to said ribs in spaced parallel relationship to the upper surface of the orifice plate, said reinforcing plate being substantially coextensive with the drawing area of the plate and perforated by a multitude of closely spaced openings;

a lining covering the interior of the chamber in the block and joined at the lower end thereof to the orifice plate; and, a deflector plate secured to said lining in spaced relationship to the orifice plate, between the upper and lower surfaces of the refractory block, said plate being disposed so as to intercept fluid flowing into the upper end of the chamber in the block and deflect such fluid toward the collection area formed by the orifice plate.

8. A bushing assembly, according to claim 7, wherein:

the outermost ribs defining the dam are imperforate and the ribs surrounded by the outermost ribs are perforated to permit substantially unrestricted fluid flow therethrough.

9. A bushing assembly, according to claim 8, wherein:

the orifice plate, reinforcing ribs and reinforcing plate are all fabricated of electrically conductive material and are joined in electrically conductive relationship to one another; and, electrode connections are provided on the orifice plate to either side of the drawing area whereby electrical current may be passed through the orifice plate, ribs, and reinforcing plate to resistance heat the orifice and reinforcing plates.

* * * * *